(12) United States Patent
Hernandez de Luna et al.

(10) Patent No.: US 10,086,779 B2
(45) Date of Patent: Oct. 2, 2018

(54) LOCKING BAR MECHANISM FOR LICENSE PLATES

(71) Applicants: Ricardo Hernandez de Luna, Ponce, PR (US); Ricardo Hernandez Soto, Ponce, PR (US)

(72) Inventors: Ricardo Hernandez de Luna, Ponce, PR (US); Ricardo Hernandez Soto, Ponce, PR (US)

( * ) Notice: Subject to any disclaimer, the term of this patent is extended or adjusted under 35 U.S.C. 154(b) by 0 days.

(21) Appl. No.: 15/603,036

(22) Filed: May 23, 2017

(65) Prior Publication Data

US 2017/0259759 A1  Sep. 14, 2017

Related U.S. Application Data

(63) Continuation-in-part of application No. 14/587,045, filed on Dec. 31, 2014, now Pat. No. 9,663,044.

(51) Int. Cl.
| | |
|---|---|
| *G09F 7/00* | (2006.01) |
| *B60R 13/10* | (2006.01) |
| *F16B 41/00* | (2006.01) |
| *B60Q 1/56* | (2006.01) |

(52) U.S. Cl.
CPC .............. *B60R 13/105* (2013.01); *B60Q 1/56* (2013.01); *F16B 41/005* (2013.01)

(58) Field of Classification Search
CPC ..... B60R 2011/0052; B60R 2011/0066; B60R 2011/0096; B65D 50/00; F16B 37/145

USPC .... 40/201, 202, 204, 209; 411/372.5, 372.6, 411/373; 52/716.6, 716.7
See application file for complete search history.

(56) References Cited

U.S. PATENT DOCUMENTS

| | | | | |
|---|---|---|---|---|
| 4,136,598 | A * | 1/1979 | Hughes | F16B 37/14 411/372 |
| 5,651,651 | A * | 7/1997 | Spencer | F16B 41/005 411/372.6 |
| 5,879,117 | A * | 3/1999 | Chen | B60R 13/105 411/372.6 |
| 5,988,966 | A * | 11/1999 | Chen | F16B 37/14 411/372 |
| 9,663,044 | B2 * | 5/2017 | Hernandez de Luna | B60R 13/105 |
| 2012/0248283 | A1 * | 10/2012 | Chen | B60R 13/105 248/551 |

* cited by examiner

*Primary Examiner* — Joanne Silbermann
(74) *Attorney, Agent, or Firm* — Eugenio J. Torres-Oyola; Victor M. Rodriguez; Ferraiuoli LLC

(57) ABSTRACT

A license plate locking system is provided that will prevent theft of a license plate. The license plate locking system of the present invention comprises a locking bar, wherein said locking bar comprises a two hollow bodies. Each hollow body provide access to a plate holder device, such as a screw, wherein said plate holder device is positioned inside said hollow body and covered by non-removable cover with resilient properties rendering the screws inaccessible. This prevents the removal of the registration tags or license plate by unauthorized persons.

8 Claims, 10 Drawing Sheets

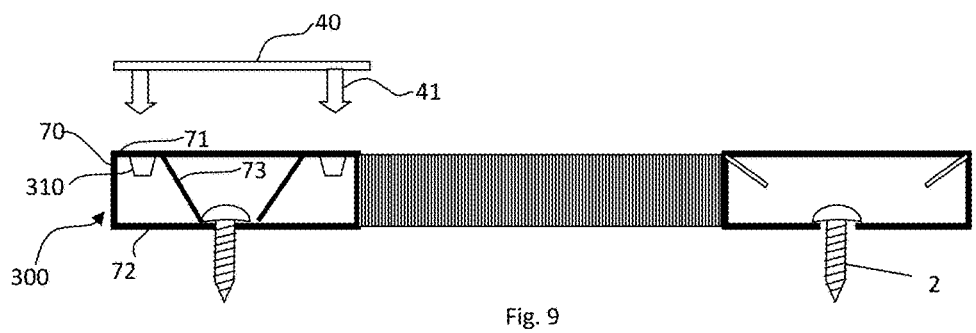
Fig. 9
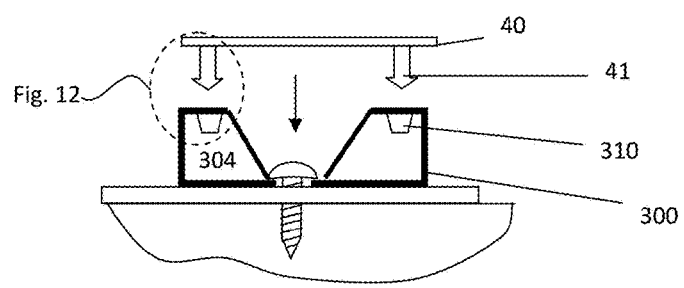
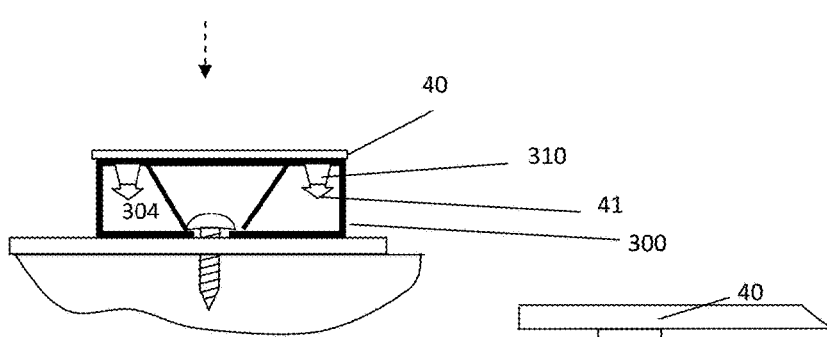
Fig. 11
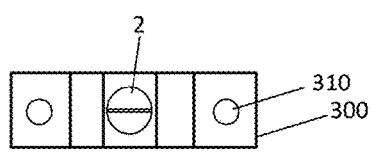
Fig. 10
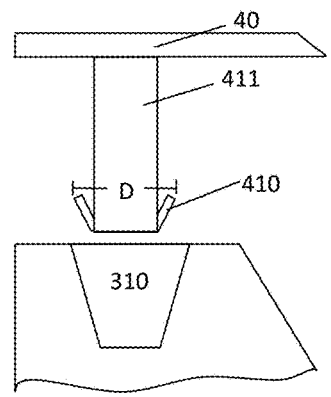
Fig. 12

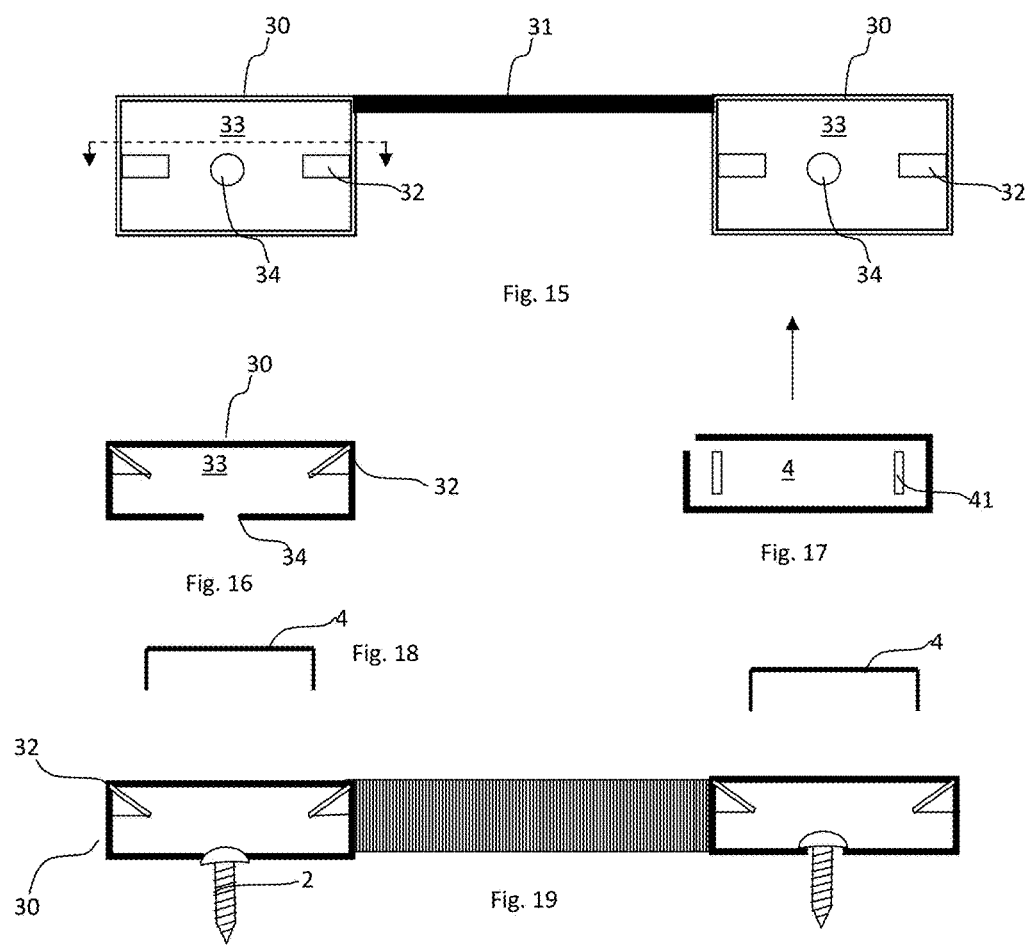

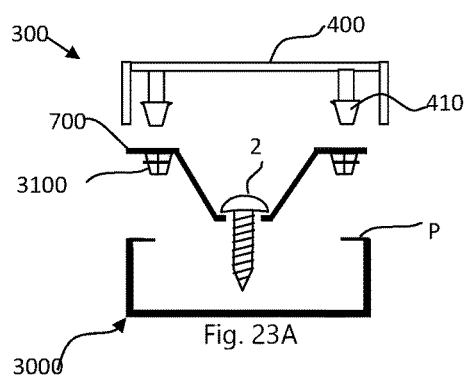
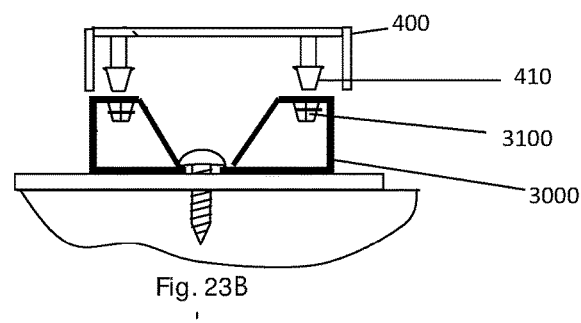
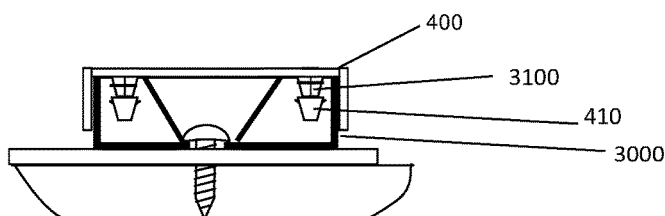
Fig. 23A
Fig. 23B
Fig. 25
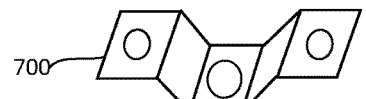
Fig. 24A
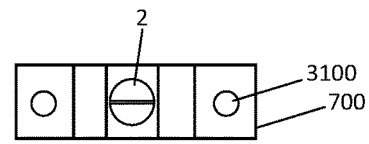
Fig. 24B
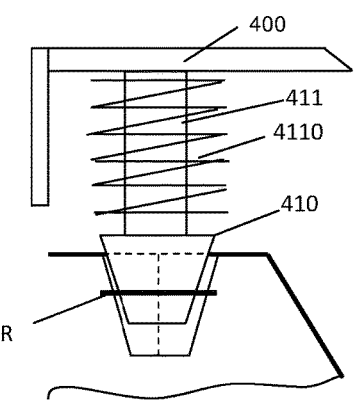
Fig. 26A
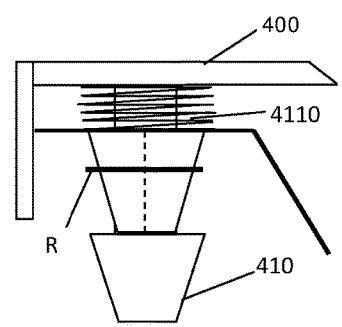
Fig. 26B

LOCKING BAR MECHANISM FOR LICENSE PLATES

STATEMENT REGARDING FEDERALLY SPONSORED RESEARCH AND DEVELOPMENT

N/A

RELATED APPLICATIONS

N/A

BACKGROUND OF THE INVENTION

Field of the Invention

The present invention relates to license plate protection means and more specifically, to a locking bar having a locking means for preventing removal of the license plate.

Discussion of the Background

The use of vehicle license plate mounts, such as screws or screw with distinctive screw heads are known in the prior art. For example FIG. 1A shows a license plate and the use of screws for holding the license plate in position. Further, in order to avoid the screws to be removed several structures had been implemented, such as different types of screw heads, as shown in FIG. 1B.

Recently the incidence of theft or unauthorized personal removing license plates has increase. Removing license plate is not just illegal but a long procedure need to be completes to get a new license plate once it is stolen.

Accordingly, there is a need in the art for a device preventing theft of a vehicular license plate and provide a simple structure which avoids the removal of the registration tags or license plate by unauthorized persons.

SUMMARY OF THE INVENTION

It is an object of the present invention to provide a locking bar mechanism that will prevent theft of a license plate.

In accordance with the principles of the present disclosure comprises a locking bar mechanism for license plates wherein the locking bar mechanism comprises a locking bar comprises at least two hollow bodies, each hollow body comprising at least a set of protrusions, a plate holder access and a cover. The cover comprises a resilient material with attaching means for said set of protrusions.

Another object is to bear an engraved message. In accordance with the principles of the present disclosure the locking bar comprises an elongated portion connecting separating the two hollow bodies, wherein said elongated body may include an engraved message.

The invention itself, both as to its configuration and its mode of operation will be best understood, and additional objects and advantages thereof will become apparent, by the following detailed description of a preferred embodiment taken in conjunction with the accompanying drawings.

When the word "invention" is used in this specification, the word "invention" includes "inventions", that is, the plural of "invention". By stating "invention", the Applicant does not in any way admit that the present application does not include more the one patentable and non-obviously distinct invention and Applicant maintains that the present application may include more than one patentably and non-obviously distinct invention. The Applicant hereby asserts, that the disclosure of the present application may include more than one invention, and, in the event that there is more than one invention, that these inventions may be patentable and non-obvious one with respect to the other.

Further, the purpose of the accompanying abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

FIG. 9 is a generic view of the inner assembly for the second exemplary embodiment for the locking bar mechanism in accordance with the principles of the present disclosure.

FIG. 10 represents the assembly process for the second exemplary embodiment of the screw and second non-removable cover in accordance with the principles of the present disclosure.

FIG. 11 is exploded view of the non-removable cover fixing means for the second exemplary embodiment in accordance with the principles of the present disclosure.

FIG. 12 is a top view of the second preferred embodiment for the locking bar without the second non-removable cover in accordance with the principles of the present disclosure.

FIG. 15 is a top view of the preferred embodiment for the locking bar without the non-removable cover in accordance with the principles of the present disclosure.

FIG. 16 is a section side view from FIG. 15 of the hollow body in accordance with the principles of the present disclosure.

FIGS. 17a and 17b are view of the non-removable cover in accordance with the principles of the present disclosure.

FIG. 18 is a side view of the non-removable cover in accordance with the principles of the present disclosure FIG. 19 is a generic view of the inner assembly with inner protrusions for the locking bar mechanism in accordance with the principles of the present disclosure.

FIGS. 23A-23B show a generic view of the inner assembly for the third exemplary embodiment for the locking mechanism in accordance with the principles of the present disclosure.

FIG. 24A-24B shows the third non-removable cover inner plate in accordance with the principles of the present disclosure.

FIG. 25 represents the assembly process for the third exemplary embodiment of the screw and third non-removable cover in accordance with the principles of the present disclosure.

FIGS. 26A-26B are exploded view of the non-removable cover fixing means for the third exemplary embodiment in accordance with the principles of the present disclosure.

DESCRIPTION OF THE PREFERRED EMBODIMENT

Figure 1A:
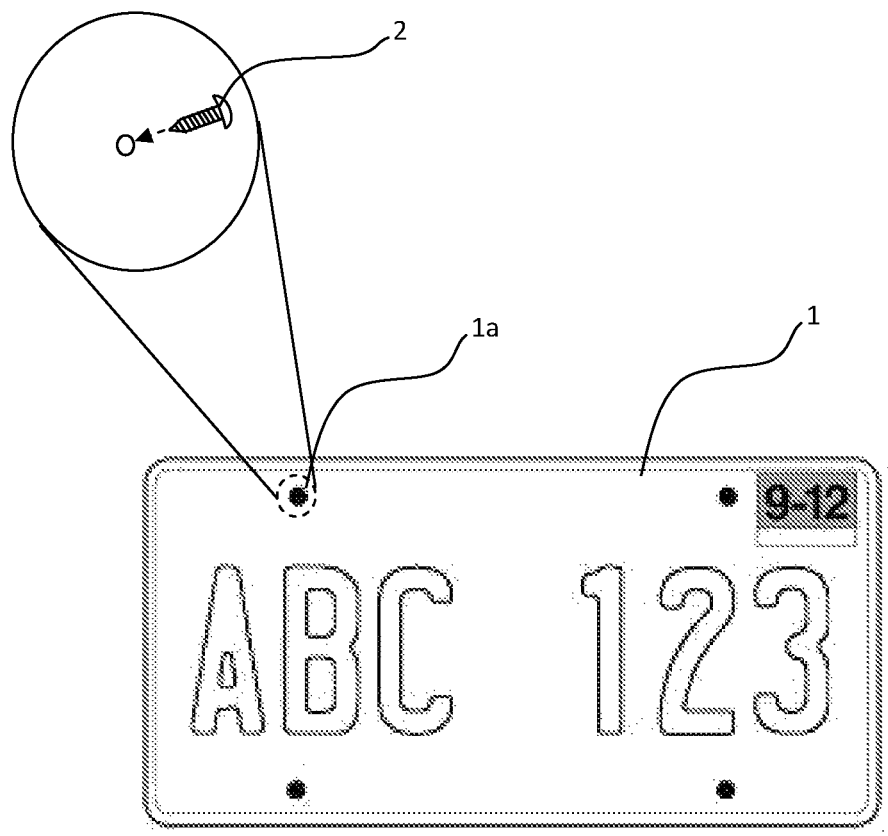
FIGS. 1A through 1B are views of current plate holder and plate holder devices.
Figure 1B:
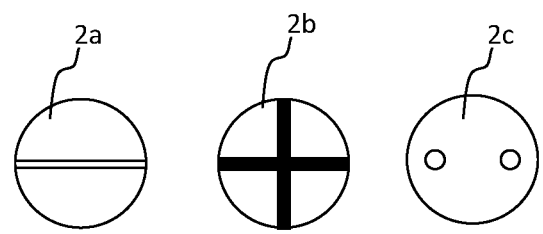

FIGS. 1A through 1B are views of current plate holder and plate holder devices. FIG. 1A shows a license plate 1 and the use of screws 2 for holding the license plate 1 in position. The use of plate holder devices 2, such as screws or screw, with distinctive screw heads 2a, 2b, 2c are known in the prior art.

Figure 2:
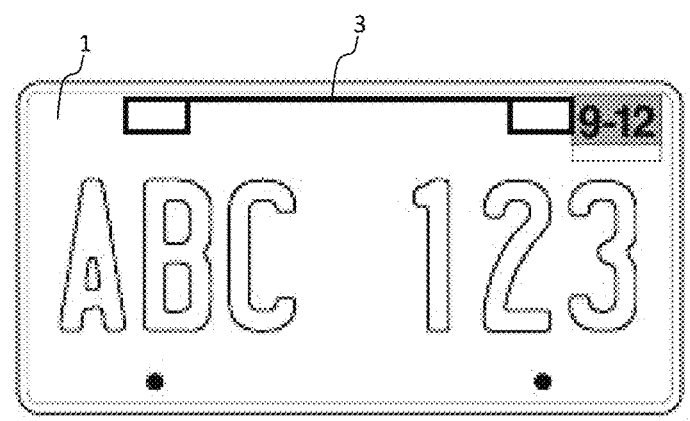
FIG. 2 is a view of the preferred embodiment for the locking bar mechanism in accordance with the principles of the present invention.
Figure 3:
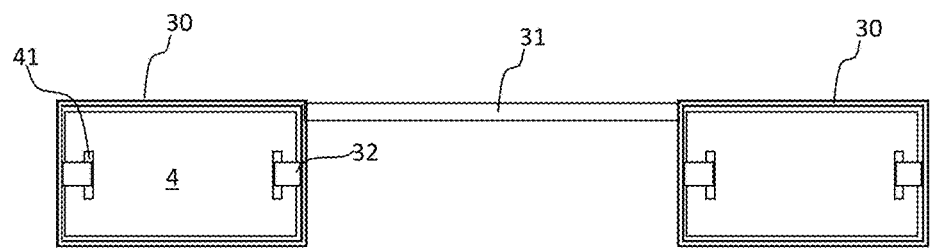
FIG. 3 is a top view of the first preferred embodiment for the locking bar in accordance with the principles of the present disclosure.

To prevent theft, a locking bar mechanism 3 is provided that covers the through holes 1a for installing the license plate 1, as shown in FIG. 2. The locking bar 3, as shown in FIG. 3, comprises at least two hollow bodies 30, an elongated body 31 between said two hollow bodies 30 and a non-retractable cover 4. The hollow body 30 creates an enclosed spaced or chamber 33, wherein said hollow body 30 comprises an opening or top section 303, bottom surface 301 and side walls 302. Further, at least a couple of projections 32 extend from the inner surface of side walls 302. The protrusions 32 are configured to hold the non-retractable cover 4. At least one exemplary configuration is presented below.

Figure 4:
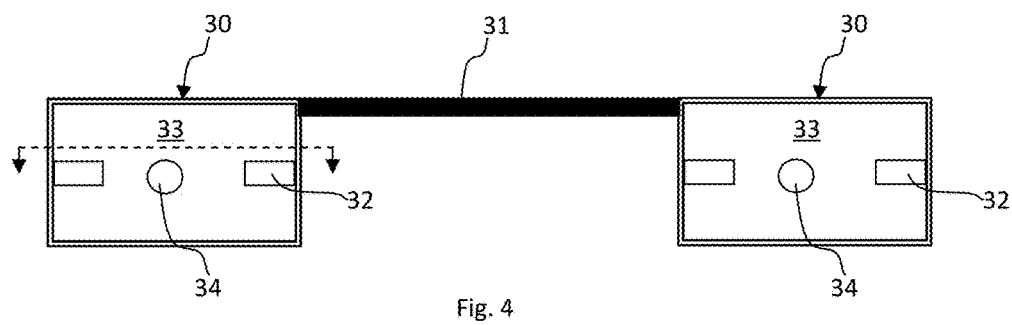
FIG. 4 is a top view of the preferred embodiment for the locking bar without the non-removable cover in accordance with the principles of the present disclosure.

FIG. 4 is a top view of the preferred embodiment for the locking bar 3 without the non-removable cover 4 in accordance with the principles of the present disclosure. The hollow body 30, more particularly the side walls 302, comprises at least a set of protrusions 32. Each protrusion 32 extends from the inner surface of the side walls 302 of the hollow body 30.

Figure 5:
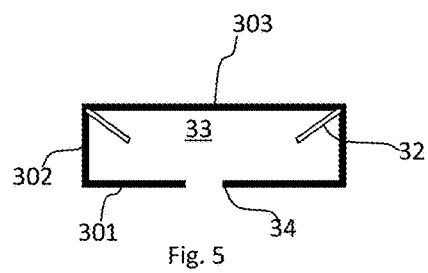
FIG. 5 is a section side view from FIG. 4 of the hollow body in accordance with the principles of the present disclosure.

FIG. 5 is a section side view from FIG. 4 of the hollow body 30 in accordance with the principles of the present disclosure. The projection 32 extends from the side wall 302 inner surface of the hollow body 30 inside the chamber 33. Further a hole 34, located at the bottom surface 301 provides access to fix the hollow body 30 with plate holder devices 2, such as a screw 2a, 2b, 2c, to the vehicle. The hollow body 30 is intended to surround the plate holder devices 2, more particularly the portion plate holder devices 2 and comprises at least a protrusion 32 which extends diagonally toward the hollow body hole 34. More than one protrusion may be employed or provided at the hollow body 30 inner walls, however the number of protrusion 32 may require a rearrange of the non-retractable cover 4 configuration.

Figure 6:
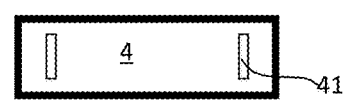
FIG. 6 is a top view of the non-removable cover in accordance with the principles of the present disclosure.

FIG. 6 is a top view of the non-removable cover 4 in accordance with the principles of the present disclosure. The non-removable cover 4 comprising at least a recess 41. It is important to understand that the number of recess may increase, however the number is related to the number of protrusions 32. In the first exemplary embodiment the hollow body comprises two protrusions 32 therefore the non-removable cover 4 comprises at least two recesses 41. One of the objects of the non-removable cover 4 is to be installed at the top of the hollow body 30 in order to avoid access to the plate holder devices 2 by adjusting and fixing the non-removable cover 4 to the protrusions 32. The non-removable cover 4 is made of a resilient material flexible enough to bend and durable enough to withstand or resist environmental exposure.

Figure 7:
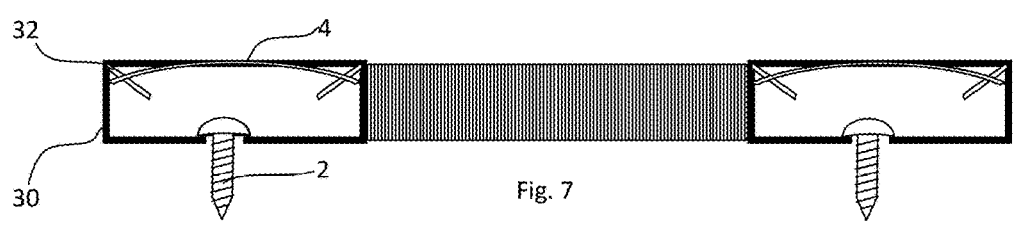
FIG. 7 is a generic view of the inner assembly for the locking bar mechanism in accordance with the principles of the present disclosure.
Figure 8A:
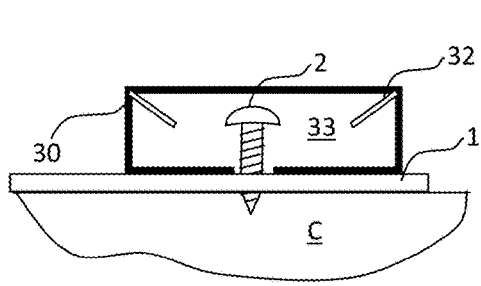
FIGS. 8A through 8D represent the assembly process of the screw and non-removable cover in accordance with the principles of the present disclosure.
Figure 8B:
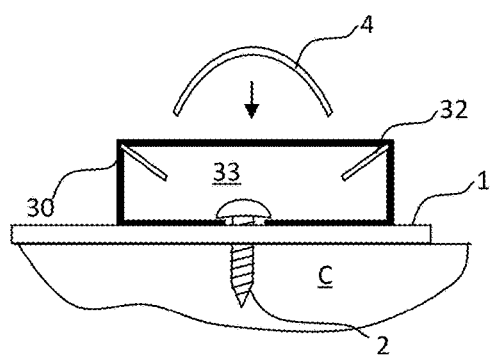
Figure 8C:
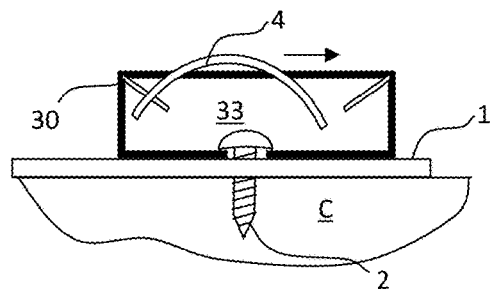
Figure 8D:
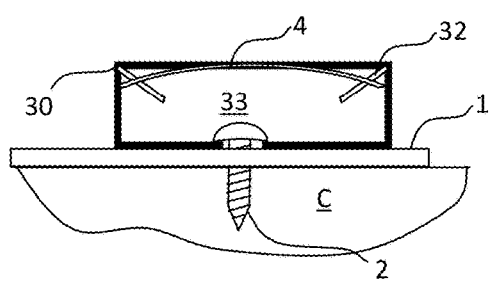

FIG. 7 is a generic view of the inner assembly for the locking bar mechanism in accordance with the principles of the present disclosure. As mentioned, the non-removable cover 4 is adjusted or fixed to the protrusions 32. In the present disclosure the non-removable cover 4 is fixed by passing said protrusions 32 through the non-removable cover recesses 41. Each recesses 41, more particularly each recess' dimension is large enough or configured to allow access to a respective protrusion 32.

The plate holder devices 2, more particularly the portion that provides pressures to the license plate 1 against the car chase, such as the screw head, is positioned inside the chamber 33. Simultaneously the screw head also fixes the hollow body 30 to the car chase C.

FIGS. 8A through 8D represent the assembly process of the screw and non-removable cover in accordance with the principles of the present disclosure. The following are the steps:

Aligning the license plate 1 and locking bar mechanism 3, more particularly the license plate hole 1a with hollow body 30 hole 34.

Inserting the plate holder devices 2 through the hollow body 30, more particularly the hollow body 30 hole 34.

Fixing the hollow body 30 and license plate 1 to the car chase C by means of a plate holder device 2.

Bending the non-removable cover 4 in order to cover the hollow body 30.

Adjusting the non-removable cover 4 by sliding the protrusions 32 through the non-removable cover 4 recesses 41.

Releasing the non-removable cover 4.

FIG. 9 is a generic view of the inner assembly for the second embodiment of the locking bar mechanism in accordance with the principles of the present disclosure. For the second embodiment a second non-removable cover 40 is adjusted or fixed to a second the hollow body 300 at the top surface of the second hollow body 300. The hollow body 300 comprises a top surface 71, side walls 70, inclined inner wall 73 and a bottom surface 72. Further the top surface 71 comprises hollow protrusions 310. The second hollow body 300 is configure to generate at least a chamber 304, wherein the opening for said chamber 304 is the hollow protrusion 310 located at the top surface 71. FIG. 10 provides a top view of the second hollow body 300. In the instant case at least two chambers 304 are created, each chamber 304 providing inner access through said hollow protrusion 310.

FIG. 11 is directed to the second exemplary embodiment assembly. As mentioned the second non-removable cover 40 is adjusted or fixed to a second the hollow body 300 at the top surface of the second hollow body 300. The second non-removable cover 40 comprises at least one cover protrusion 41. The second non-removable cover 40 is fixed by passing said cover protrusions 41 through the hollow protrusions 310. Each hollow protrusions 310, more particularly each opening dimension is large enough or configured to allow access to a respective cover protrusions 41. In the instant case the hollow protrusion 310 comprises a funnel-like shape having both ends open. The lower end has a diameter smaller than the upper end. The cover protrusion 41 pass through the hollow protrusion 310 and extends beyond the lower end.

Further, as shown in FIG. 12, the cover protrusions 41 comprises an elongated body 411 and an engaging mechanism 410 to fix said second non-removable cover 40 to the second hollow body 300. The engaging mechanism 410 comprises at least one extended arm made of resilient material which is configured to be deformed or compressed while the cover protrusions 41 passes through the hollow protrusion 310. After the cover protrusions 41 passes through the hollow protrusion 310 the engaging mechanism 410, which extends beyond the hollow portion 310 lower end, decompressed or return to its original shape. The distance D created by the engaging mechanism 410 at its original shape, more particularly the distance between extended arms, should be greater than the diameter of the lower end of the hollow protrusion 310. The engaging mechanism 410 avoids the removal of said second non-removable cover 40 because it avoids the lifting of said second non-removable cover 40 once it passes through the hollow protrusion 310. The differences in diameter at the hollow protrusion 310 provides enough space for sliding the cover protrusions 41 through the hollow protrusion 310 inner body and eventually fixing said second non-removable cover 40 by means of said engaging mechanism 410.

The plate holder devices 2, more particularly the portion that provides pressures to the license plate 1 against the car chase, such as the screw head, is positioned inside the first hollow body 30 and/or the second hollow body 300. Simultaneously the screw 2 head also fixes the hollow body 30, 300 to the car chase C.

Figure 13:
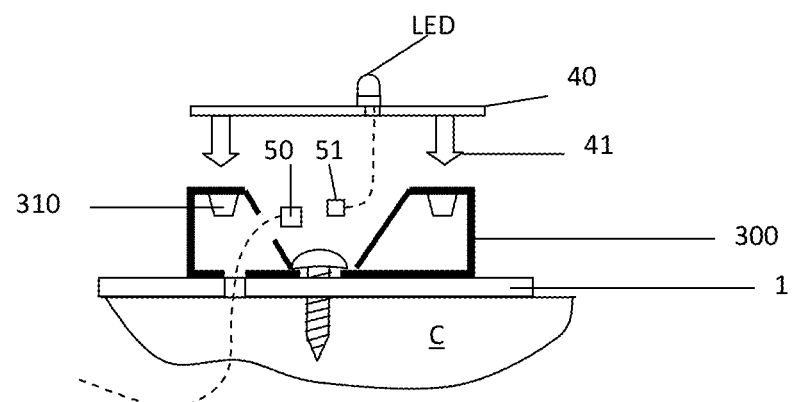
FIG. 13 represents the assembly process for the second exemplary embodiment comprising non-removable cover identifier in accordance with the principles of the present disclosure.
Figure 14:
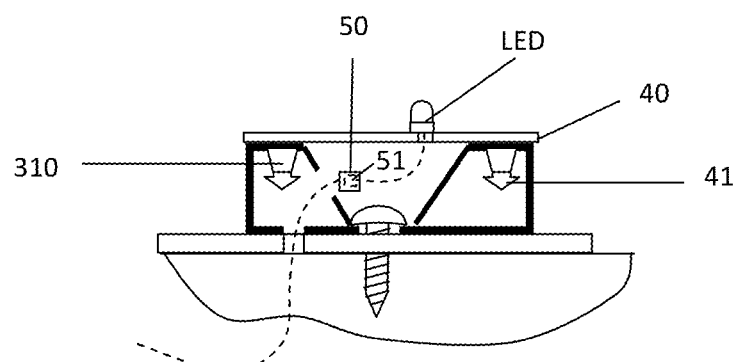
FIG. 14 represents the second exemplary embodiment assembly comprising non-removable cover identifier in accordance with the principles of the present disclosure.
Figure 20A:
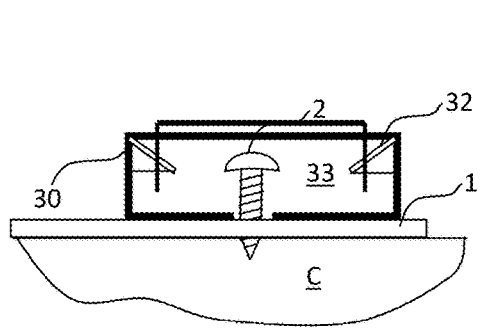
FIGS. 20A through 20D represent the assembly process of the screw and non-removable cover with a lock bar in accordance with the principles of the present disclosure.
Figure 20B:
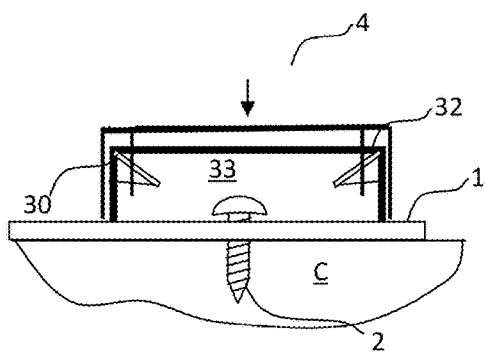
Figure 20C:
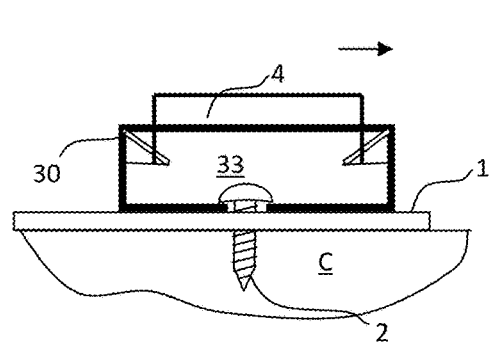
Figure 20D:
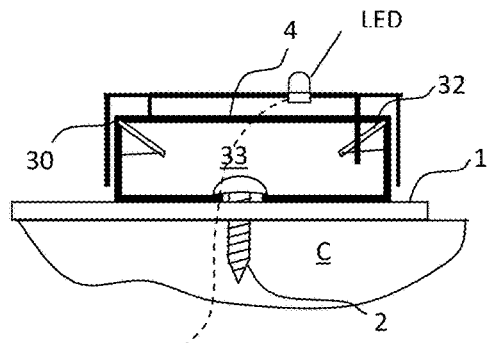
Figure 21:
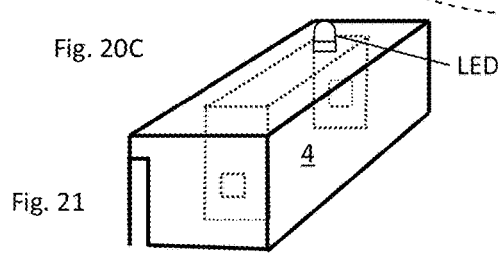
FIG. 21 is an isometric view of the non-removable cover of FIG. 17a for the locking bar mechanism in accordance with the principles of the present disclosure.
Figure 22A:
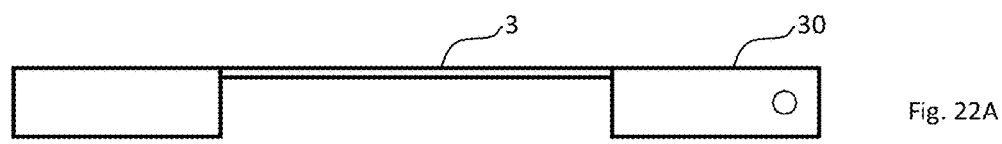
FIGS. 22A through 22B represents the assembly of the exemplary embodiment including elongated body between hollow bodies in accordance with the principles of the present disclosure.
Figure 22B:
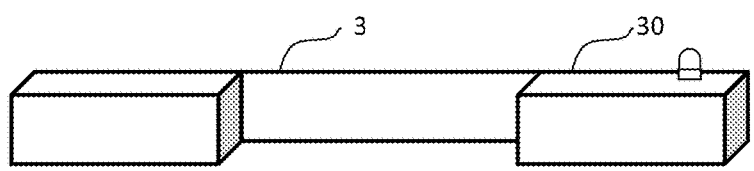

Another object of the present invention if to regulate if a license plate 1 has been removed. FIG. 13 and FIG. 14 disclose a fourth embodiment providing a system to identify if the license plate 1 has been removed. The alert system comprises a hollow body and a cover with a visual identifier.

The cover, for example the second non-removable cover comprises an illumination device LED, such as a light emitting device, wherein said illumination device LED is located on the opposite side of the cover protrusions 41.

Further, the second non-removable cover 40 comprises a recess wherein a first wire 51 connecting the illumination device LED pass through it. Further, a second wire 50 extends from the second hollow body 300. The second wire 50 is connected directly or indirectly to a power source. In order to connect the second wire 50 to the power source a second recess is provided at the inclined inner wall 73 and a third recess is provided at bottom surface 72. The second recess and third recess provide access for the second wire 50 to extend and connect with said first wire 51. FIG. 14 is an exemplary connection between the first wire 51 and second wire 50. Once the connection between wires is made the second non-removable cover 40 is fixed avoiding access to the plate holder devices 2. The second non-removable cover 40 is fixed as describe above for the second embodiment. In the instant case if someone tries to remove the second non-removable cover 40 the connection and illumination device LED will end up disconnected. Therefore, if no power source is connected to the illumination device LED no illumination is provided assisting the traffic police to identify when a license plate was removed.

Regarding FIGS. 15-22B the elements are the same as mentioned above. A side view of at least two configurations for the non-removable cover 4 in accordance with the principles of the present disclosure are presented. As disclosed above, the non-removable cover 4 comprises at least a recess 41. It is important to understand that the number of recess may increase, however the number is related to the number of protrusions 32. Also, as mentioned above, the objects of the non-removable cover 4 is to be installed at the top of the hollow body 30 in order to avoid access to the plate holder devices 2 by adjusting and fixing the non-removable cover 4 to the protrusions 32. The non-removable cover 4 is made of a resilient material flexible enough to bend and durable enough to withstand or resist environmental exposure. In accordance with the principles of the present disclosure FIG. 17A through 17B discloses the non-removable cover 4 to be adjusted or fixed to the protrusions 32. In the present disclosure the non-removable cover 4 is fixed by passing said protrusions 32 through the non-removable cover 4 recesses 41. Each recesses 41, more particularly each recess' dimension is large enough or configured to allow access to a respective protrusion 32.

FIGS. 23A-23B show a generic view of the inner assembly for the third embodiment of the locking bar mechanism in accordance with the principles of the present disclosure. For the third embodiment a second non-removable cover 400 is adjusted or fixed to a third hollow body 3000, more particularly at the top surface of the third hollow body 3000. The third locking mechanism 300 comprises the third hollow body 3000, an inner plate 700 and the second non-removable cover 400. The third hollow body 3000 comprises a bottom surface with a hole, side walls and at least one projecting edge P. The projecting edges or flanges, extends toward the center of the hollow body and away from the side walls. The projecting edges assists supporting the inner plate 700 in place. The inner plate 700, which is located inside said third hollow body 3000 and hold in position by said projecting edge P, comprises a top surface, inclined inner wall and a bottom surface with a hole, as shown in FIG. 24A through 24B. Further the inner plate 700 comprises hollow protrusions 3100. The third hollow body 3000 is configure to generate at least a chamber, wherein the opening for said chamber is the hollow protrusion 3100 located at the top surface of plate 700, wherein said hollow protrusions 3100 extends toward the inner area of said chamber. The hollow protrusion is configured to expand while an elongated body 411 pass through it. A resilient band R is attached at the outer surface of said hollow protrusion 3100 in order to assists the hollow protrusion 3100 to compress back to its original configuration once the cover protrusion of said elongated body 411, which has a radius bigger than the exit of the hollow body 3100, pass through it. The top surface is in contact with the flange P. In the instant case the inner plate 700 might be bended to be inserted, without a perpetual deformation, inside the cavity of the hollow body 3000. Once located inside the cavity said plate 700 in combination with the third hollow body creates at least two chambers, each chamber providing inner access through said hollow protrusion 3100.

FIG. 25 is directed to the third exemplary embodiment assembly. As mentioned the third non-removable cover 400 is adjusted or fixed to a second the hollow body 3000 at the top surface of the bendable inner plate 700. The third non-removable cover 400 comprises at least one cover protrusion 410 and lateral walls. The third non-removable cover 400 is fixed by passing said cover protrusions 410 through the hollow protrusions 3100. Each hollow protrusions 3100, more particularly each opening dimension is configured to expand in order to allow access to a respective cover protrusions 410 while it is adjusted. After passing though the resilient band R assist to compress the hollow protrusion to its original configuration. In the instant case the hollow protrusion 3100 comprises a funnel-like shape having both ends open. The lower end has a diameter smaller than the upper end. The cover protrusion 410 pass through the hollow protrusion 3100 and extends beyond the lower end.

Further, as shown in FIG. 26A-26B, the cover protrusions 410 comprises an elongated body 411 and an engaging mechanism 4100, such as an elastic member, to fix said third non-removable cover 400 to the third hollow body 3000. The engaging mechanism 4100 comprises at least one resilient material which is configured to be deformed or compressed while the cover protrusions 410 passes through the hollow protrusion 3100. After the cover protrusions 410 passes through the hollow protrusion 3100, the hollow protrusion 3100 compressed or return to its original shape. The engaging mechanism 410 avoids the removal of said third non-removable cover 400 because it adjust the cover 400 in such way that avoids the lifting of said third non-removable cover 400 once it is compressed between the hollow protrusion 3100 and the cover 400. The engaging mechanism 410 diameter is preferred to be bigger than the hollow protrusion 3100 inner radius. The differences in diameter at the hollow protrusion 3100 provides enough space for sliding the cover protrusions 410 through the hollow protrusion 3100 inner body and eventually fixing said third non-removable cover 400 by means of said engaging mechanism 4100.

The plate holder devices 2, more particularly the portion that provides pressures to the license plate 1 against the car chase, such as the screw head, is positioned inside the first hollow body 300 the second hollow body 300 and/or third hollow body 3000. Simultaneously the screw 2 head also fixes the hollow body 30, 300, 3000 to the car chase C.

Figure 27:
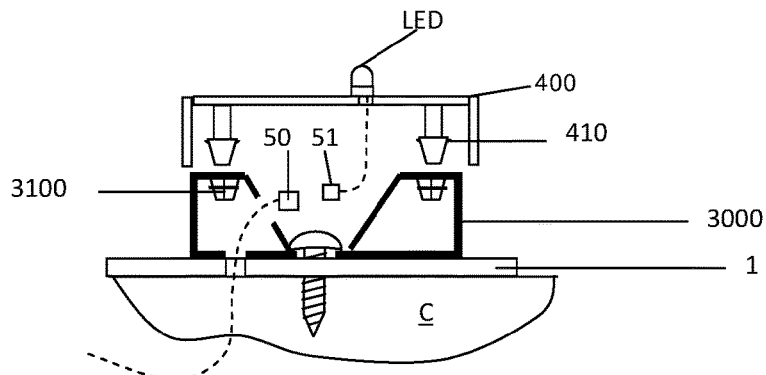
FIG. 27 represents the assembly process for the third exemplary embodiment comprising non-removable cover identifier in accordance with the principles of the present disclosure.
Figure 28:
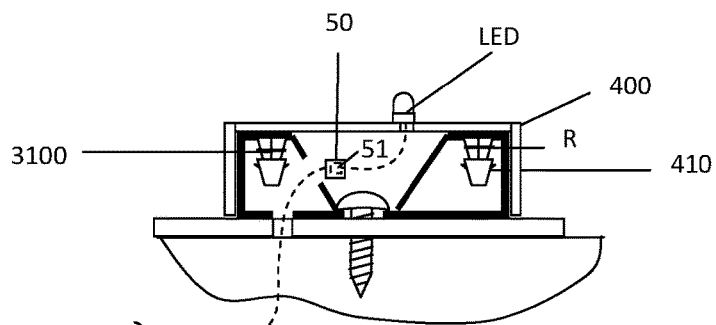
FIG. 28 represents the third exemplary embodiment assembly comprising non-removable cover identifier in accordance with the principles of the present disclosure.

Another object of the present invention if to regulate if a license plate 1 has been removed. FIG. 27 and FIG. 28 disclose a fifth embodiment providing a system to identify if the license plate 1 has been removed. The alert system comprises a hollow body and a cover with a visual identifier.

Figure 29A:
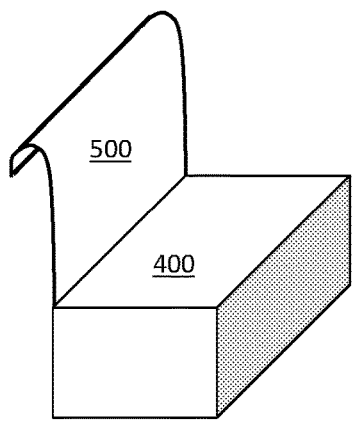
FIGS. 29A-29B represents the third preferred embodiment for the locking mechanism with attaching mechanism in accordance with the principles of the present disclosure.
Figure 29B:
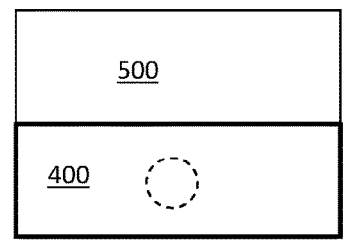

The cover, for example the second non-removable cover 400 comprises an illumination device LED, such as a light emitting device, wherein said illumination device LED is located on the opposite side of the cover protrusions 410. Further, the second non-removable cover 400 comprises a recess wherein a first wire 51 connecting the illumination device LED pass through it. Further, a second wire 50 extends from the third hollow body 3000. The second wire 50 is connected directly or indirectly to a power source. In order to connect the second wire 50 to the power source a second recess is provided at the inclined inner wall and a third recess is provided at bottom surface. The second recess and third recess provide access for the second wire 50 to extend and connect with said first wire 51. FIG. 28 is an exemplary connection between the first wire 51 and second wire 50. Once the connection between wires is made the third non-removable cover 400 is fixed avoiding access to the plate holder devices 2. The third non-removable cover 400 is fixed as describe above for the second embodiment. In the instant case if someone tries to remove the third non-removable cover 400 the connection and illumination device LED will end up disconnected. Therefore, if no power source is connected to the illumination device LED no illumination is provided assisting the traffic police to identify when a license plate was removed. FIG. 29A through 29B are directed to the attaching mechanism 500 for the locking mechanism 300. As presented the attaching mechanism 500 is configured to surround the license plate. The cover 400, as shown, surrounds the hollow body 3000. The attaching mechanism extends from said hollow body 3000. The attaching mechanism comprises a hook configuration which assists to hold in position once is located on the license plate.

The invention is not limited to the precise configuration described above. For example, it should be noted that the present invention can be used to protect other encased documents or signs, e.g., a motorcycle, bicycle or trailer license plate. While the invention has been described as having a preferred design, it is understood that many changes, modifications, variations and other uses and applications of the subject invention will, however, become apparent to those skilled in the art without materially departing from the novel teachings and advantages of this invention after considering this specification together with the accompanying drawings. Accordingly, all such changes, modifications, variations and other uses and applications which do not depart from the spirit and scope of the invention are deemed to be covered by this invention as defined in the following claims and their legal equivalents. In the claims, means-plus-function clauses, if any, are intended to cover the structures described herein as performing the recited function and not only structural equivalents but also equivalent structures.

All of the patents, patent applications, and publications recited herein, and in the Declaration attached hereto, if any, are hereby incorporated by reference as if set forth in their entirety herein. All, or substantially all, the components disclosed in such patents may be used in the embodiments of the present invention, as well as equivalents thereof. The details in the patents, patent applications, and publications incorporated by reference herein may be considered to be incorporable at applicant's option, into the claims during prosecution as further limitations in the claims to patentable distinguish any amended claims from any applied prior art.

We claim:
1. A locking mechanism for license plates comprising:
at least a hollow body, each hollow body comprising a top section including an opening, a bottom surface, a flange and side walls, wherein said flange extends from said side walls, wherein said side walls extend perpendicularly from the bottom surface creating a cavity, wherein said bottom surface comprises a hole;

at least an inner plate, wherein said inner plate comprises at least a hollow protrusion, wherein said inner plate is configured to be located at the top section; and at least a cover, wherein said cover comprises at least a cover protrusion, wherein said cover is configured to be fixed to said hollow protrusion inside said cavity, wherein said hollow protrusion is configured to provide access to said cover protrusion, wherein said cover protrusion is configured to pass through said hollow protrusion.

2. The locking mechanism of claim 1, wherein said hollow protrusion extends toward the bottom surface.

3. The locking mechanism of claim 1, wherein said hollow protrusion comprises a resilient element.

4. The locking mechanism of claim 1, wherein said cover comprises lateral walls.

5. The locking mechanism of claim 1, comprising at least an attaching mechanism.

6. The locking mechanism of claim 5, wherein said attaching mechanism extends away from the hollow body and wherein said attaching mechanism comprises a hook configuration to attach the locking mechanism to the license plate.

7. The locking mechanism of claim 1, wherein said cover comprises an illumination device.

8. Method for assembling a locking mechanism for license plate comprising the steps of:
   a) providing a license plate comprising at least a license plate hole;
   b) aligning a locking mechanism with said license plate, wherein said locking mechanism comprises an attaching mechanism, at least a hollow body, a non-removable cover comprising at least a cover protrusion, and a bendable inner plate; wherein said inner plate comprises at least a hollow protrusion and at least a plate bottom surface hole; wherein the hollow body comprises a flange and bottom surface hole, wherein said bottom surface hole is aligned with at least said license plate hole;
   c) inserting at least a plate holder device through the hollow body, the inner plate and said license plate hole;
   d) fixing the hollow body and license plate to a surface by means of a plate holder device;
   e) adjusting the non-removable cover by sliding the cover protrusion through the hollow protrusion.

\* \* \* \* \*

UNITED STATES PATENT AND TRADEMARK OFFICE
CERTIFICATE OF CORRECTION

PATENT NO. : 10,086,779 B2
APPLICATION NO. : 15/603036
DATED : October 2, 2018
INVENTOR(S) : Ricardo Hernandez De Luna and Ricardo Hernandez Soto It is certified that error appears in the above-identified patent and that said Letters Patent is hereby corrected as shown below:

On the Title Page

Regarding Inventor's name: "de" in the name "Ricardo Hernandez De Luna" was misspelled with a lowercase letter "d". The referenced name should instead read "Ricardo Hernandez De Luna".

Signed and Sealed this
Thirteenth Day of November, 2018

Andrei Iancu
*Director of the United States Patent and Trademark Office*